R. A. ADAMS.
FRAMES FOR GRAINING PLATES.
No. 170,695. Patented Dec. 7, 1875.
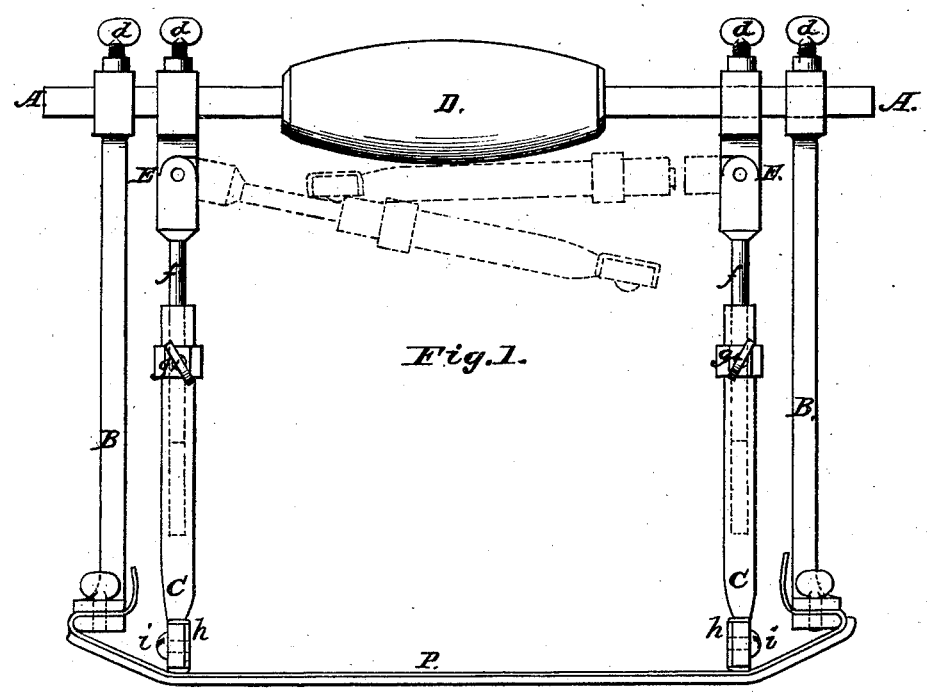
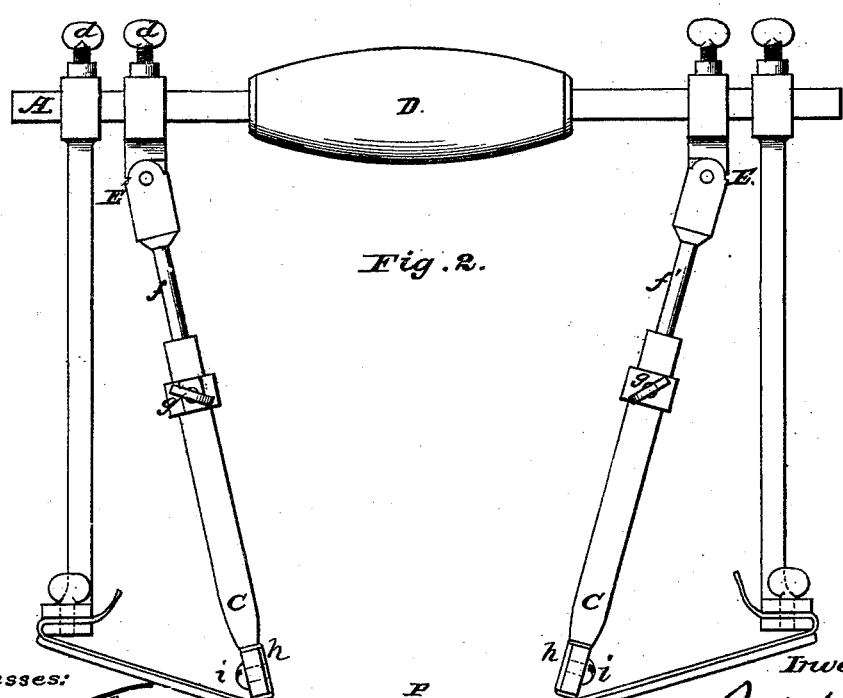
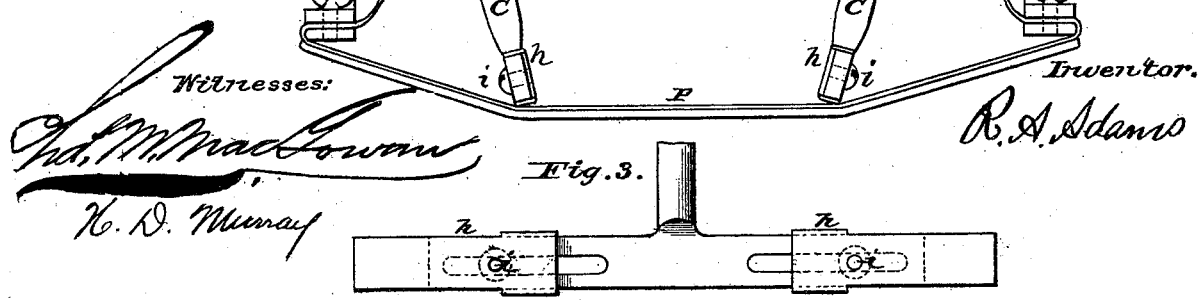

UNITED STATES PATENT OFFICE.

ROBERT A. ADAMS, OF PITTSBURG, PENNSYLVANIA.

IMPROVEMENT IN FRAMES FOR GRAINING PLATES.

Specification forming part of Letters Patent No. 170,695, dated December 7, 1875; application filed May 20, 1875.

*To all whom it may concern:*

Be it known that I, ROBERT A. ADAMS, of the city of Pittsburg, in the county of Allegheny and State of Pennsylvania, have invented a new and useful Improvement in Frames for Holding Elastic Transfer-Plates for Graining, which improvement is fully set forth in the following specification, reference being had to the accompanying drawings.

The object of my invention is to facilitate the use of the elastic transfer-plates for graining, which was patented to me on the 26th day of May, 1874, by Letters Patent No. 151,337, by stretching the plates over an adjustable frame instead of pinning them to the surface to be decorated with hooks, as by the former process.

The frame consists of a straight bar of iron or steel, A, with a handle, D, firmly fixed at the middle of it, and adjustable arms B B and C C, which slide along the bar, and may be fastened to it at any desired point by the thumb-screws $d\ d\ d\ d$. The arms B B have lateral projections at the lower ends, which are provided with either hooks or clamps, by means of which the elastic plate is fastened to the arms.

Figs. 1 and 2 show the plate P fastened to the arms B B by clamps and thumb-screws; but it may also be attached to the said arms by hooks.

The arms C C are made with joints E E in the stem, by means of which they can be turned up under the handle when not in use, as is shown by the dotted lines in Fig. 1. These arms C C may be lengthened or shortened, as desired, by means of slides $f\!f$ in the stem, which are controlled by the thumb-screws $g\ g$, and are also provided at their lower end with lateral projections or stretchers, Fig. 3, which stretchers are adjustable to different widths by means of slides $h\ h$ and screws $i\ i$. The arms C C are for forcing the elastic plate into sunken panels, and any desirable number may be used. The projections on the arms B B, and the stretchers on the arms C C, may be shaped to conform to the surface to be decorated.

To use the frame, attach the plate to the arms B B by means of the hooks or clamps on the lateral projection; then move the arms along the bar A until the plate is stretched very tightly, and secure the arms to the bar by the thumb-screws $d\ d$. Apply the paint to the plate with a roller, lay the plate carefully upon the surface to be decorated, and rub it gently with the hand or a soft pad over the back, and it transfers the paint to the surface.

To decorate sunken surfaces, loosen the arms B B, so that the plate will hang loose; turn down the arms C C; lengthen them by the slides $f\!f$, as required; adjust the stretchers to the width of the sunken panel by the slides $h\ h$, and tighten by means of the screws; then extend B B along the bar A, until the plate is stretched tightly, and apply as in decorating plane surfaces.

I claim as my invention—

A frame for holding elastic transfer-plates for graining, consisting of the bar, handle, adjustable arms, adjustable stems, joints, lateral projections, hooks, clamps, adjustable stretchers, and screws, the whole combined and arranged substantially as and for the purpose above described.

R. A. ADAMS.

Witnesses:
   CHAS. M. MACGOWAN,
   JAMES E. WAUGH.